A. L. HAWKESWORTH.
DRILL.
APPLICATION FILED NOV. 20, 1918.

1,296,078. Patented Mar. 4, 1919.
2 SHEETS—SHEET 1.

WITNESSES:
Harry A. Beimer
Jos. Michef

INVENTOR.
Arthur L. Hawkesworth
BY Emil Starek
ATTORNEY.

A. L. HAWKESWORTH.
DRILL.
APPLICATION FILED NOV. 20, 1918.
1,296,078.
Patented Mar. 4, 1919.
2 SHEETS—SHEET 2.
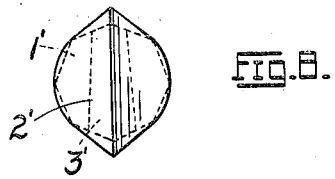
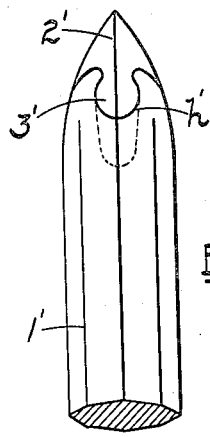
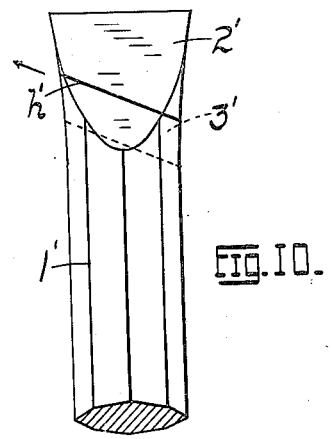
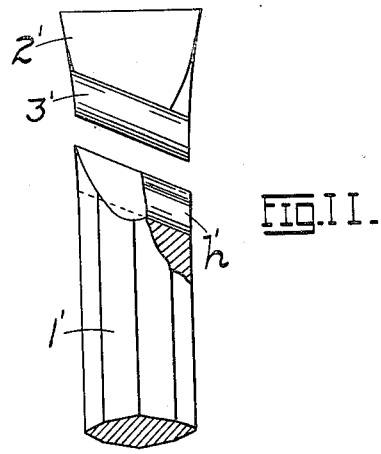
WITNESSES:
INVENTOR.
Arthur L. Hawkesworth
BY Emil Starek
ATTORNEY.

UNITED STATES PATENT OFFICE.

ARTHUR L. HAWKESWORTH, OF BUTTE, MONTANA.

DRILL.

1,296,078.  Specification of Letters Patent.  Patented Mar. 4, 1919.

Application filed November 20, 1918. Serial No. 263,394.

*To all whom it may concern:*

Be it known that I, ARTHUR L. HAWKESWORTH, a citizen of the United States, residing at Butte, in the county of Silverbow and State of Montana, have invented certain new and useful Improvements in Drills, of which the following is a full, clear, and exact description, reference being had to the accompanying drawings, forming a part hereof.

The present invention is directed to improvements in drills, and has for its object to provide a detachable bit or cutting end for a drill bar or shank for the purpose of drilling holes in rocks, in the ground or in any hard substances whatsoever. A further object is to provide means for fastening the bit in such a way as to insure its retention on the bar or shank while in service, and yet permit instant removal of the bit when desired, as for example when it is necessary to detach an old bit and attach a new one, or when the bit is removed from the shank for safekeeping in a tool chest, or detached for purposes of sharpening, or for any other purpose. The advantages of the invention will be fully apparent from the following detailed description in connection with the accompanying drawings in which—

Figure 1:
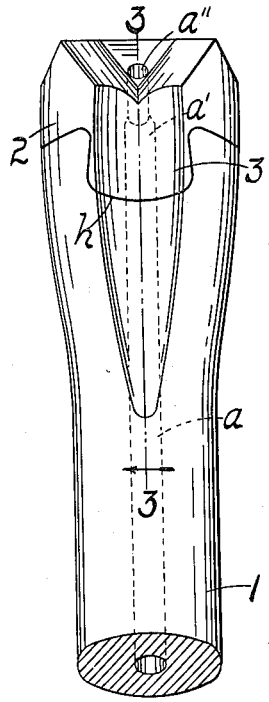
Figure 2:
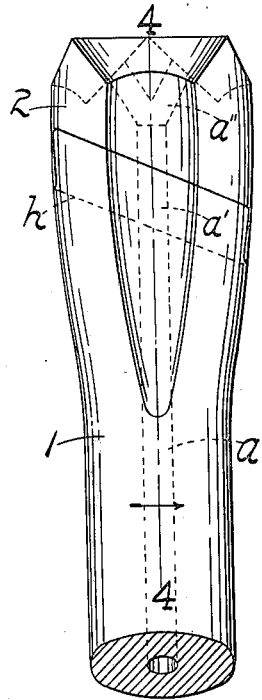
Figure 3:
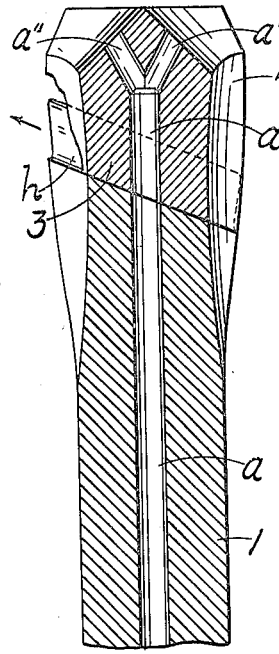
Figure 4:
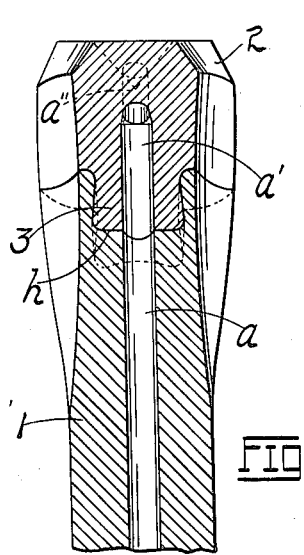
Figure 5:
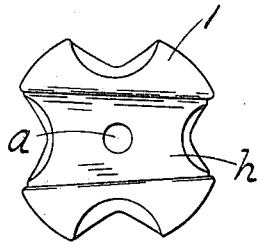
Figure 6:
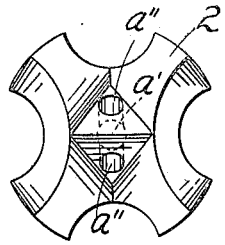
Figure 7:
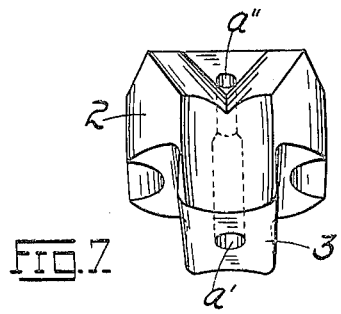

Figure 1 represents an elevation of a drill shank turned to present the wide end of the dove-tail terminal groove thereof receiving the corresponding tongue of the bit or cutting end; Fig. 2 is an elevation of the shank turned to present a side view of the bit; Fig. 3 is a longitudinal middle section on the line 3—3 of Fig. 1; Fig. 4 is a corresponding section in a plane at right angles to the section in Fig. 3, taken on the line 4—4 of Fig. 2; Fig. 5 is an end view of the inclined dove-tail taper groove terminal of the shank; Fig. 6 is an end view of the cutting end of the bit; Fig. 7 is an elevation of the bit detached, turned to present the wide terminal of the inclined dove-tailed tapered tongue thereof; Fig. 8 is an end view of the cutting end of a modified form of bit; Fig. 9 is an elevation of a tool shank with the bit shown in Fig. 8, attached and turned to present the wide end of the groove receiving the bit; Fig. 10 is an elevation of the shank and bit shown in Fig. 9, turned ninety degrees so as to present a side view of the bit; and Fig. 11 is a view similar to Fig. 10 but showing the bit detached from the shank, a part of the groove wall of the shank being broken away.

Referring to the drawings, and for the present to Figs. 1 to 7 inclusive, 1, represents a drill-bar or shank provided with a central passage-way or duct $a$ for the passage of water usually employed in drilling operations as well understood in the art. The shank 1 terminates at one end (the end opposite that from which the same is operated) in a dove-tail groove $h$, having its bottom, and the transverse edges of its side or bounding walls parallel and disposed diagonally or on an incline to the axis of the shank, said walls tapering in a direction toward the operating end of the shank or away from the cutting end of the bit 2 secured at the drilling end of the shank. The bit 2 is provided with an inclined, tapering dove-tail tongue 3 conforming to the shape of the groove $h$, the portions of the bit on opposite sides of the tongue engaging the inclined edges of the bounding walls of the groove $h$. The bit is provided with a central passage-way or duct $a'$ forming (when the parts are assembled) a continuation of the passage-way $a$ of the shank, the outer or discharge end of the duct terminating in the forks or diverging passages $a''$, $a''$, for the discharge of the water. The drill shank and drill bit can be made of any steel, and made any size, length, or shape; and the drill bit may also be made of chilled cast iron if desired.

The bottom, and the transverse edges of the bounding walls of the groove $h$ being inclined to the longitudinal axis of the shank, and the wide end of the groove being nearest the cutting end of the bit, it is obvious that pressure or hammering on the operating end of the shank will have the effect of driving the drilling end of the shank "up" the incline of the tongue 3, or what amounts to the same thing, driving the bit "down" the incline of the groove $h$ toward the narrow end of the groove, whereby the drill bit in the normal operation of the drill tends to tighten rather than to loosen. On the other hand, to detach the bit from the shank all that is necessary is to strike the bit on the side of the small or narrow end of the tongue (at the narrow end of the groove) thereby forcing the bit across the longitudinal axis of the shank toward the wide end of the groove, or in the direction shown by the arrow in Fig. 3, the bit readily slipping out of the groove. While in the present embodiment of my invention the groove $h$ is formed in the shank and the tongue 3 on the bit, the reverse of this arrangement (that is, with the tongue on the shank and the groove in the bit) would come within the spirit of my invention.

Obviously, the construction is susceptible of considerable modification. I need not for example limit myself to two discharge ports $a''$, the number depending on the shape of the bit; and I may dispense with the water passages $a, a', a''$, altogether, as shown in the modifications in Figs. 8 to 11 inclusive. Here we have a shank $1'$ terminating in an inclined taper dove-tail groove $h'$ receiving the correspondingly shaped tongue $3'$ of a bit $2'$, the operation being in all respects the same as in the form first described. The invention is of course applicable to any reciprocating or rotating shank, bar, or other member employed for drilling or boring purposes, to which a bit or cutting end may be applied and to which it may be detachably secured.

It will be seen from the foregoing that the coupling means by which the bit is secured to the drill bar or shank is such as to cause the bit to be locked or tightened to the shank by a relative movement of the parts across the axis of the shank in one direction, the bit becoming loosened from the shank by a corresponding movement of the parts in the opposite direction.

Having described my invention what I claim is:

1. In combination with a drill bar or shank terminating at one end in a dove-tail groove having side or bounding walls tapering in the general direction from the drilling end of the shank, the bottom of the groove and the transverse edges of its bounding walls being parallel and disposed on a diagonal or at an incline to the shank axis, a bit provided with a tongue conforming to said groove and insertible thereinto, as set forth.

2. In combination with a drill bar or shank terminating at one end in a dove-tail groove having side or bounding walls tapering in the general direction from the drilling end of the shank, the bottom of the groove and the transverse edges of its bounding walls being parallel and disposed on a diagonal or at an incline to the shank axis, a bit provided with a tongue conforming to said groove and insertible thereinto, and formations on the sides of the tongue engaging the free transverse edges of the side walls of the shank groove.

3. The combination with a drill bar or shank terminating at one end in a dove-tail groove having side or bounding walls tapering in the general direction from the drilling end of the shank, the bottom of the groove and the free edges of the bounding walls transverse to the shank axis being parallel and disposed on a diagonal or at an incline to the shank axis, a bit provided with a tongue conforming to said groove and insertible thereinto, and formations on the sides at the base of the tongue engaging the free inclined transverse edges of the bounding walls of the shank groove, the wide ends of the groove and tongue being nearest the cutting end of the bit.

In testimony whereof I affix my signature, in presence of two witnesses.

ARTHUR L. HAWKESWORTH.

Witnesses:
JOSEPH J. ARMSTRONG,
WILLIAM F. WADDELL.